US011967041B2

(12) United States Patent
Badam et al.

(10) Patent No.: US 11,967,041 B2
(45) Date of Patent: Apr. 23, 2024

(54) GEOSPATIAL IMAGE PROCESSING FOR TARGETED DATA ACQUISITION

(71) Applicant: Microsoft Technology Licensing, LLC, Redmond, WA (US)

(72) Inventors: Anirudh Badam, Issaquah, WA (US); Ranveer Chandra, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 87 days.

(21) Appl. No.: 17/323,358

(22) Filed: May 18, 2021

(65) Prior Publication Data
US 2022/0375031 A1 Nov. 24, 2022

(51) Int. Cl.
*G06T 3/40* (2006.01)
*B64C 39/02* (2023.01)
*B64D 47/08* (2006.01)
*B64U 10/13* (2023.01)
*B64U 101/30* (2023.01)
*G06T 3/4038* (2024.01)
*G06T 11/20* (2006.01)
*G06V 20/13* (2022.01)

(52) U.S. Cl.
CPC .......... *G06T 3/4038* (2013.01); *B64C 39/024* (2013.01); *B64D 47/08* (2013.01); *G06T 11/206* (2013.01); *G06V 20/13* (2022.01); *B64U 10/13* (2023.01); *B64U 2101/30* (2023.01)

(58) Field of Classification Search
CPC ... G06T 3/4038; G06T 11/206; B64C 39/024; B64C 2201/027; B64C 2201/127; B64D 47/08; G06V 20/13
See application file for complete search history.

(56) References Cited

U.S. PATENT DOCUMENTS

| | | | |
|---|---|---|---|
| 2010/0321470 A1* | 12/2010 | Oshima | G03B 37/00 348/E7.092 |
| 2017/0053538 A1 | 2/2017 | Samarasekera et al. | |
| 2018/0124293 A1* | 5/2018 | Cohen | H04M 1/0264 |
| 2018/0239991 A1* | 8/2018 | Weller | G06F 16/907 |
| 2018/0295375 A1* | 10/2018 | Ratner | H04N 19/23 |
| 2019/0234749 A1* | 8/2019 | Hsu | G01C 21/3602 |
| 2020/0082611 A1* | 3/2020 | Haramaty | G06T 17/05 |

(Continued)

OTHER PUBLICATIONS

"Achieving Storage Efficiency through EMC Celerra Data Deduplication", In White Paper of EMC, Jan. 2009, 15 Pages.

(Continued)

*Primary Examiner* — Nasim N Nirjhar
(74) *Attorney, Agent, or Firm* — Schwegman Lundberg & Woessner, P.A.

(57) ABSTRACT

A computer implemented method includes obtaining data for raw image frames captured by a moving camera. The raw image frames are indexed geographically, and a graph is created from the multiple raw image frames. The graph includes image frames as vertices and edges that represent image frames having overlapping image information. The method further includes skipping frames based on the amount of overlap, determining a frame having an interesting feature, using the graph to find additional raw image frames that have the interesting feature, combining multiple raw image frames to form a unique image frame, and transmitting the unique image frame.

18 Claims, 4 Drawing Sheets

(56) References Cited

U.S. PATENT DOCUMENTS

| | | | |
|---|---|---|---|
| 2020/0213578 | A1 | 7/2020 | Holzer et al. |
| 2021/0343087 | A1* | 11/2021 | Gomez Gonzalez ........................ G06F 16/338 |
| 2022/0207472 | A1* | 6/2022 | Hashisho ............... G06V 10/25 |
| 2022/0236055 | A1* | 7/2022 | Isaksson ................ G01C 11/06 |

OTHER PUBLICATIONS

"Advanced video coding for generic audiovisual services", In Publications of ITU-T Recommendation H.264, Sep. 6, 2019, 836 Pages.

"Alliance for Open Media", Retrieved From: https://web.archive.org/web/20210331135154/https://aomedia.org/av1-features/, Mar. 31, 2021, 2 Pages.

"Citrix SD-WAN", Retrieved from: https://web.archive.org/web/20210420110103/https://www.citrix.com/products/citrix-sd-wan/, Apr. 20, 2021, 25 Pages.

"DJI Terra", Retrieved from: https://web.archive.org/web/20210418181214/https://www.dji.com/dji-terra, Apr. 18, 2021, 19 Pages.

"DOT: Data-Oriented Transfer", Retrieved from: https://web.archive.org/web/20191116122902/http://www.cs.cmu.edu/~dot-project/, Nov. 16, 2019, 2 Pages.

"Dronedeploy", Retrieved from: https://web.archive.org/web/20210126100425/https://support.dronedeploy.com/docs/making-successful-maps, Jan. 26, 2021, 17 Pages.

"Federal Communications Commission", Retrieved from: https://docs.fcc.gov/public/attachments/FCC-20-50A1.pdf, Apr. 24, 2020, pp. 1-54.

"Fujitsu Laboratories Develops WAN Acceleration Technology that can Adapt to Combined Communications Networks", https://www.fujitsu.com/global/about/resources/news/press-releases/2014/0916-01.html, Sep. 16, 2014, 9 Pages.

"GDAL", Retrieved from: https://web.archive.org/web/20210420065315/https://gdal.org/, Apr. 20, 2021, 12 pages.

"High efficiency video coding", In Publications of ITU-T Recommendation H.265, Jan. 10, 2020, 712 Pages.

"How to verify that there is enough overlap between the images", Retrieved from: https://web.archive.org/web/20201030193000/https://support.pix4d.com/hc/en-us/articles/203756125-How-to-verify-that-there-is-enough-overlap-between-the-images, Oct. 30, 2020, 4 Pages.

"Libpng", Retrieved from: https://web.archive.org/web/20210419033641/http://libpng.org/pub/png/libpng.html, Apr. 19, 2021, 10 Pages.

"North Powder", Retrieved from: https://web.archive.org/web/20181129080345/https://www.northpowder.com/, Nov. 29, 2018, 9 Pages.

"OpenTSDB", Retrieved from : https://web.archive.org/web/20210310052928/http://opentsdb.net/, Mar. 10, 2021, 2 Pages.

"PIX4D", Retrieved from http://web.archive.org/web/20161202093817/https://pix4d.com/, Dec. 2, 2016, 3 Pages.

"PostGIS", Retrieved from: https://web.archive.org/web/20210420115135/https://postgis.net/, Apr. 20, 2021, 6 pages.

"Riverbed", Retrieved from: https://web.archive.org/web/20201201173400/https://www.riverbed.com/in/products/steelconnect/steelconnect-ex.html, Dec. 1, 2020, 7 Pages.

"Wavefront OBJ", Retrieved from: https://web.archive.org/web/20201028141155/https://docs.blender.org/manual/en/latest/addons/import_export/scene_obj.html, Oct. 28, 2020, 6 Pages.

"ZoneMinder", Retrieved from: https://web.archive.org/web/20210401151223/https://zoneminder.com/features/, Apr. 1, 2021, 3 Pages.

Agustsson, et al., "Generative Adversarial Networks for Extreme Learned Image Compression", In Proceedings of IEEE/CVF International Conference on Computer Vision, Oct. 27, 2019, pp. 221-231.

Babaee, et al., "A Deep Convolutional Neural Network for Video Sequence Background Subtraction", In Journal of Pattern Recognition, vol. 76, Apr. 2018, pp. 1-28.

Bakkay, et al., "BSCGAN: Deep Background Subtraction with Conditional Generative Adversarial Networks", In Proceedings of 25th IEEE International Conference on Image Processing (ICIP), Oct. 7, 2018, pp. 4018-4022.

Ballé, et al., "End-to-end optimized image compression", In Proceedings of 5th International Conference on Learning Representations, Apr. 24-26, 2017, pp. 1-27.

Canel, et al., "Scaling Video Analytics on Constrained Edge Nodes", In Repository of arXiv:1905.13536v1, May 24, 2019, 13 Pages.

Carney, et al., "Monitoring streams—a new class of data management applications", In Proceedings of the 28th International Conference on Very Large Databases, Jan. 1, 2002, 12 pages.

Chen, et al., "Glimpse: Continuous, Real-Time Object Recognition on Mobile Devices", In Proceedings of 13th ACM Conference on Embedded Networked Sensor Systems, Nov. 1, 2015, 14 Pages.

Ciucur, Paul, "How can we improve the OneDrive experience on Windows?", https://onedrive.uservoice.com/forums/913522-onedrive-on-windows/suggestions/6802608-allow-priority-settings-for-files-being-uploaded, Dec. 4, 2014, 10 Pages.

Debnath, et al., "Chunkstash: Speeding up inline storage deduplication using flash memory", In Proceedings of USENIX annual technical conference, Jun. 23, 2010, pp. 1-15.

Dorigine, Auteur, "How to prioritize the upload of files", Retrieved from: https://support.google.com/drive/forum/AAAAOxCWsToJvZX4JEObwg/?hl=fr, May 30, 2018, 2 Pages.

Dufaux, et al., "The JPEG XR Image Coding Standard", In Proceedings of IEEE Signal Processing Magazine, vol. 26, Issue 6, Nov. 2009, pp. 195-204.

El-Shimi, et al., "Primary data deduplication-large scale study and system design", In Proceedings of {USENIX} Annual Technical Conference, 2012, 12 pages.

Goodfellow, et al., "Generative Adversarial Nets", In Proceedings of Annual Conference on Neural Information Processing Systems, Dec. 8, 2014, 9 Pages.

Gupta, et al., "Bolt: Data Management for Connected Homes", In Proceedings of the 11th USENIX Conference on Networked Systems Design and Implementation, Apr. 2, 2014, pp. 243-256.

Harwell, et al., "Microsoft Rocket Video Analytics Platform", Retrieved From: https://web.archive.org/web/20201116152040/https://github.com/microsoft/Microsoft-Rocket-Video-Analytics-Platform, Retrieved on: Nov. 16, 2020, 11 Pages.

He, et al., "Recognition of car makes and models from a single traffic-camera image", In Journal of IEEE Transactions on Intelligent Transportation Systems, vol. 16, Issue 6, Dec. 2015, pp. 3182-3192.

Hsieh, et al., "Focus: Querying Large Video Datasets with Low Latency and Low Cost", In Proceedings of 13th Symposium on Operating Systems Design and Implementation, Oct. 18, 2018, pp. 269-286.

Huang, et al., "A buffer-based approach to rate adaptation: Evidence from a large video streaming service", In Proceedings of the ACM conference on SIGCOMM, Aug. 17, 2014, pp. 187-198.

Zhu, et al., "Avoiding the Disk Bottleneck in the Data Domain Deduplication File System", In Proceedings of the 6th USENIX Conference on File and Storage Technologies, Feb. 26, 2008, 14 Pages.

Ihm, et al., "Wide-area network acceleration for the developing world", In Proceedings of the USENIX Conference on USENIX Annual Technical Conference, Jun. 23, 2010, 14 Pages.

Isola, et al., "Image-to-image translation with conditional adversarial networks", In Proceedings of the IEEE conference on computer vision and pattern recognition, Jul. 21, 2017, pp. 1125-1134.

Jiang, et al., "Chameleon: Scalable Adaptation of Video Analytics", In Proceedings of the Conference of the ACM Special Interest Group on Data Communication, Aug. 2018, pp. 253-266.

Kang, et al., "Optimizing Deep CNN-based Queries Over Video Streams at Scale", In Journal of The Computing Research Repository, Mar. 7, 2017, 13 Pages.

(56) References Cited

OTHER PUBLICATIONS

Li, et al., "Efficient Batched Synchronization in Dropbox-Like Cloud Storage Services", In Proceedings of 14th International Middleware Conference, vol. 8275, Dec. 9, 2013, pp. 307-327.

Li, et al., "Learning convolutional networks for content-weighted image compression.", In Proceedings of the IEEE Conference on Computer Vision and Pattern Recognition, Jun. 18, 2018, pp. 3214-3223.

Li, et al., "Towards network-level efficiency for cloud storage services", In Proceedings of the Conference on Internet Measurement Conference, Nov. 5, 2014, pp. 115-128.

Lim, et al., "Enhanced Deep Residual Networks for Single Image Super-Resolution", In Proceedings of the IEEE Conference on Computer Vision and Pattern Recognition Workshops, Jul. 21, 2017, 9 Pages.

Liu, et al., "Machine vision guided 3d medical image compression for efficient transmission and accurate segmentation in the clouds", In Proceedings of the IEEE/CVF Conference on Computer Vision and Pattern Recognition, Jun. 16, 2019, pp. 12687-12696.

Mao, et al., "Neural Adaptive Video Streaming with Pensieve", In Proceedings of Conference of ACM Special Interest Group on Data Communication, Aug. 21, 2017, pp. 197-210.

"NetApp Data Compression, Deduplication, and Data Compaction", In Technical Report—TR-4476, Feb. 2018, 75 Pages.

Mentzer, et al., "Practical full resolution learned lossless image compression", In Proceedings of the IEEE/CVF Conference on Computer Vision and Pattern Recognition, Jun. 16, 2019, pp. 10629-10638.

Mirza, et al., "Conditional Generative Adversarial Nets", In Repository of arXiv:1411.1784v1, Nov. 6, 2014, 7 Pages.

Owens, et al., "Visually indicated sounds", In Proceedings of the IEEE Conference on computer vision and pattern recognition, Jun. 27, 2016, pp. 2405-2413.

Rabbani, et al., "An Overview of the JPEG 2000 Still Image Compression Standard", In Journal of Signal Processing: Image Communication, vol. 17, Issue 1, Jan. 1, 2002, pp. 3-48.

Radford, et al., "Unsupervised Representation Learning with Deep Convolutional Generative Adversarial Networks", In Repository of arXiv:1511.06434v1, Nov. 19, 2015, 15 Pages.

Rippel, et al., "Real-time adaptive image compression", In International Conference on Machine Learning, Aug. 6, 2017, 9 Pages.

Zhou, et al., "Scene Parsing through ADE20K Dataset", In Proceedings of the IEEE Conference on Computer Vision and Pattern Recognition, Jul. 21, 2017, pp. 633-641.

Salimans, et al., "Improved techniques for training gans", In Proceedings of Advances in Neural Information Processing Systems, Dec. 5, 2016, pp. 1-10.

Sandler, et al., "Mobilenetv2: Inverted residuals and linear bottlenecks", In Proceedings of the IEEE Conference on Computer Vision and Pattern Recognition, Jun. 18, 2018, pp. 4510-4520.

Shah, et al., "microsoft / AirSim", Retrieved from: https://github.com/microsoft/AirSim, Jan. 14, 2021, 12 pages.

Sun, et al., "CS2P: Improving Video Bitrate Selection and Adaptation with Data-Driven Throughput Prediction", In Proceedings of the ACM SIGCOMM Conference, Aug. 22, 2016, pp. 272-285.

Sun, et al., "Region-based rate control and bit allocation for wireless video transmission", In Journal of IEEE Transactions on Multimedia, vol. 8, Issue 1, Feb. 2006, pp. 1-10.

Theis, et al., "Lossy image compression with compressive autoencoders", In International Conference on Learning Representations, Mar. 1, 2017, pp. 1-19.

Toderici, et al., "Full Resolution Image Compression with Recurrent Neural Networks", In Proceedings of IEEE Conference on Computer Vision and Pattern Recognition, Jul. 21, 2017, pp. 1-9.

Toderici, et al., "Variable Rate Image Compression with Recurrent Neural Networks", In Repository of arXiv:1511.06085v1, Nov. 19, 2015, pp. 1-9.

Oord, et al., "Conditional image generation with PixelCNN decoders", In Proceedings of 30th Conference on Neural Information Processing Systems, Dec. 5, 2016, pp. 1-9.

Wallace, Gregory K., "The JPEG Still Picture Compression Standard", In Proceedings of the IEEE transactions on consumer electronics, vol. 38, Issue 1, Feb. 1992, 17 Pages.

Wang, et al., "Deep high-resolution representation learning for visual recognition", In Journal of IEEE transactions on pattern analysis and machine intelligence, Mar. 2020, pp. 1-23.

Wang, et al., "Generative Image Modeling Using Style and Structure Adversarial Networks", In Proceedings of European Conference on Computer Vision, Sep. 17, 2016, pp. 318-335.

Wang, et al., "Image Quality Assessment: from Error Visibility to Structural Similarity", In Journal of IEEE Transactions on Image Processing, vol. 13, Issue 4, Apr. 13, 2004, pp. 600-612.

Wang, et al., "Information Content Weighting for Perceptual Image Quality Assessment", In Journal of IEEE Transactions on Image Processing, vol. 20, No. 5, May 2011, pp. 1185-1198.

Xie, et al., "Source Compression with Bounded DNN Perception Loss for IoT Edge Computer Vision", In The Proceedings of 25th Annual International Conference on Mobile Computing and Networking, Oct. 21, 2019, 16 pages.

Yeo, et al., "Neural Adaptive Content-Aware Internet Video Delivery", In the Proceedings of 13th USENIX Symposium on Operating Systems Design and Implementation, Oct. 8, 2018, pp. 645-661.

Zhang, et al., "Awstream: Adaptive wide-area streaming analytics", In Proceedings of the ACM SIGCOMM Conference on Applications, Technologies, Architectures, and Protocols for Computer Communication, Aug. 20, 2018, pp. 236-252.

Zhang, et al., Colorful Image Colorization, In European Conference on Computer Vision, Oct. 8, 2016, 29 Pages.

Zhang, et al., "Live Video Analytics at Scale with Approximation and Delay-Tolerance", In Proceedings of The14th USENIX Symposium on Networked Systems Design and Implementation, Mar. 27, 2017, pp. 377-392.

Zhang, et al., "The Design and Implementation of a Wireless Video Surveillance System", In Proceedings of the 21st Annual International Conference on Mobile Computing and Networking, Sep. 7, 2015, pp. 426-438.

Zhao, et al., "Pyramid scene parsing network", In Proceedings of the IEEE Conference on Computer Vision and Pattern Recognition, Jul. 21, 2017, pp. 2881-2890.

"Set sync priority on a per-folder basis", [online]. Retrieved from the Internet: <https://forum.odrive.com/t/set-sync-priority-on-a-per-folder-basis/636>, (2021), 4 Pages.

Massa, et al., "maskronn-benchmark: Fast, modular reference implementation of Instance Segmentation and Object Detection algorithms in PyTorch", [online]. [archived: Dec. 4, 2020]. Retrieved from the Internet: <URL: https://web.archive.org/web/20201204032744/https://github.com/facebookresearch/maskronn-benchmark>, (2020), 10 Pages.

Sadka, Abdul H., "Compressed Video Communication", John Wiley & Sons, Ltd., (2002), 289 Pages.

"International Search Report and Written Opinion Issued in PCT Application No. PCT/US22/026249", Mailed Date: Jul. 20, 2022, 13 Pages.

Meo, et al., "The Exploitation of Data from Remote and Human Sensors for Environment Monitoring in the SMAT Project", In Journal of Sensors, vol. 12, Issue 12, Dec. 17, 2012, pp. 17504-17535.

Renwick, et al., "Drone-based Reconstruction for 3D Geospatial Data Processing", In Proceedings of IEEE 3rd World Forum on Internet of Things, Dec. 12, 2016, pp. 729-734.

Office Action Received for European Application No. 22727528.6, mailed on Jan. 3, 2024, 3 pages.

\* cited by examiner

GEOSPATIAL IMAGE PROCESSING FOR TARGETED DATA ACQUISITION

BACKGROUND

Three-dimensional imagery-based analytics are driving the next generation of remote surveillance and monitoring applications. Drone cameras provide captured images of desired areas that contains highly redundant information. The images may cover a portion of a desired area being surveyed from multiple angles at different times during the survey.

Raw images captured in such settings are typically processed into a 3D image and uploaded as an aggregate to the cloud for analysis. Such analyses are being increasingly used in various commercial industries such as agriculture, mining, construction, energy, forestry, and disaster management to extract insights that then form the basis for taking actions/making decisions.

Three-dimensional imagery is necessary to analyze structural, geometric, volumetric, and other holistic properties of real-world objects. For example, the structural integrity of a building, mine, wind turbine, or a long stretch of railroad/pipeline requires 3D images to measure various geometric properties for calculating micro-stresses and changes. Similarly, accurate fruit count, volume, etc., of a tree (or individual trunk, branches, leaves), are properties that can be easily obtained from 3D images. However, constructing an accurate 3D image is a complex process and takes tens of minutes to hours for typical surveys.

Once the images are processed, it may become apparent that the images collected were insufficient to derive data needed for analytics. For example, not all the fruit trees were captured from sufficient angles to derive a count of fruit on the trees. One or more additional surveys may be needed to capture more images following the construction of 3D images, causing delay in obtaining enough data to extract the desired insights, which can lead to further delays in taking actions and making decisions.

SUMMARY

A computer implemented method includes obtaining data for raw image frames captured by a moving camera. The raw image frames are indexed geographically, and a graph is created from the multiple raw image frames. The graph includes image frames as vertices and edges that represent image frames having overlapping image information. The method further includes skipping frames based on the amount of overlap, determining a frame having an interesting feature, using the graph to find additional raw image frames that have the interesting feature, combining multiple raw image frames to form a unique image frame, and transmitting the unique image frame.

DETAILED DESCRIPTION

Figure 1:
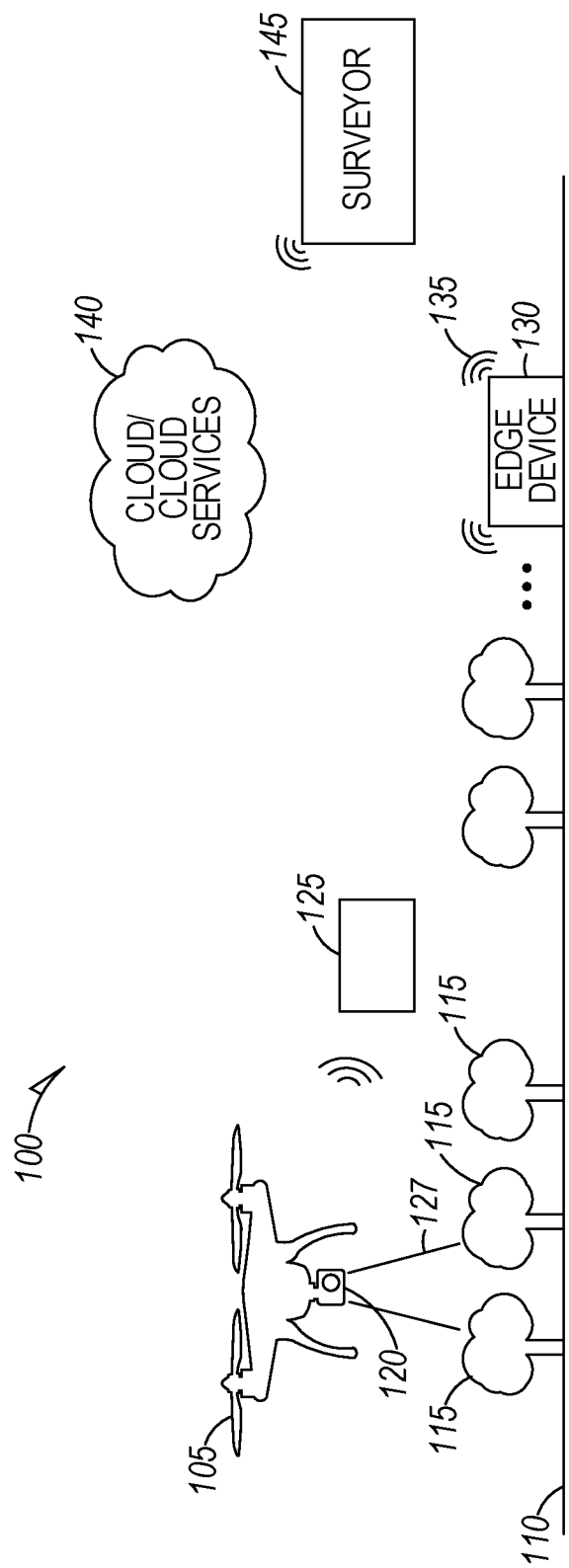
FIG. 1 is a block diagram illustrating a system that utilizes a drone for conducting an image-based survey of an area and for processing the images to reduce data transmission according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware, or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Three-dimensional imagery-based analytics are driving the next generation of remote monitoring applications. Drones with cameras may be used to survey areas to obtain images. Low bandwidth network connections can cause great delays in the data collection and lead to multiple iterations of data collection when insufficient data is collected during a survey. Such low bandwidth connections can make it difficult to quickly obtain sufficient data and perform corresponding analytics to diagnose and solve problems associated with assets being monitored using drones in remote parts of the world. There is an unmet need in providing such analytics in an interactive manner during a survey to optimize data collection and analysis, as well as for taking actions and making decisions based on the analysis.

Existing mechanisms either compromise on the quality of insights by not building 3D images from drone collected images of objects in an area and also analyze individual 2D images in isolation or spend tens of minutes building a 3D image before obtaining and uploading insights.

There is an unmet need in running such analyses interactively with latency as low as few minutes. Three-dimensional imagery is necessary to analyze structural, geometric, volumetric, and other holistic properties of real-world objects. For example, the structural integrity of a building, mine, wind turbine, or a long stretch of railroad/pipeline requires 3D images to measure various geometric properties for calculating micro-stresses and changes. Similarly, accurate fruit count, volume, etc., of a tree (or individual trunk, branches, leaves), are properties that can be easily obtained from 3D images. However, constructing an accurate 3D image is a complex process and takes tens of minutes to hours for typical surveys.

Data needed for 3D image construction is typically obtained as individual 2D image frames (or simply a frame) from cameras in motion that captures a very small part of the landscape. Hence, any information that is useful to gain a specific 3D insight is typically spread across multiple such frames.

A simplistic approach of analyzing each frame individually, or in groups determined by temporal or spatial locality (GPS location of the camera at the time of capturing the frame), is often inadequate for obtaining accurate 3D insights. Temporal locality is not enough because frames needed for constructing a specific object of interest may be acquired over a period of time (such as images from different angles). Whereas, spatial locality is not sufficient as such frames of interest may be captured from various distant locations.

Correlating across space and time quickly grows into a complex time-consuming task. Existing video analytics techniques do not support cross-correlating information across 100-1000 s of frames (typical for 3D image settings) that are neither spatially nor temporally local. State-of-the-art 3D solutions first consolidate the entire data by stitching together the raw frames into a single large 3D image that virtually represents the region surveyed. Such an image is then uploaded to cloud applications for generating insights. This process, however, typically takes several minutes to a few hours with state-of-the-art 3D image construction mechanisms and bottlenecks interactive and analytical applications running in the cloud.

The problem of timely 3D image analysis is most prominent in manual/automatic drone, robotic, and vehicle-based surveys, of the remote parts of the world, in the commercial industry where edge systems face both compute and network bottlenecks. Significant challenges, of limited compute availability and limited network connectivity, hinder real-time drone data analytics.

FIG. 1 is a block diagram illustrating a system 100 that utilizes a drone 105 for conducting an image-based survey of an area such as landscape 110 having objects 115 of interest. The objects in this example are trees, such as fruit trees. The images may be optical images, LiDAR (light detection and ranging) images, SAR (synthetic aperture radar) images or other types of images. The term "camera" is used to describe a device capable of capturing such images. The survey may be intended for an application that determines the amount of fruit on each tree in one example.

The drone 105 includes a camera 120 that periodically captures images 125 as it moves over the area. The camera 120 has a field of view that may be thought of as a cone 127 with a limited coverage of the area. Moving the drone 105 over the area provides a great number of images 125 in an attempt to capture images of each of the objects of interest. While an aerial drone 105 is shown, various other types of drones, such as ground bots and smart vehicles may be used in further examples.

In one example, drone 105 may have a wireless connection to an edge device 130 which may be used by an operator to control drone 105. Other types of drones, such as smart vehicles may include the edge device 130 functions. The edge device 130 receives the images from the drone 105 camera 120 and performs processing on the images as described in further detail below. The edge device 130 may have a fairly weak network connection 135 to cloud services 140, especially in remote areas where many surveys are likely conducted. A surveyor 145 may access the drone data in the cloud to provide interactive feedback to the operator to ensure sufficient data is collected for full analysis by the surveyor 145. The surveyor 145 represents both a person and processing resources for convenience of illustration.

It is not possible to transmit all collected images in real time to the cloud services 140 from edge device 130 over such a weak network connection. Real time, in the context of image collection means that the connection is insufficient to completely transmit a collected image before a next image is collected.

Interactive drone data analytics are necessary for various applications including but not limited to many different scenarios. One scenario is referred to as informed exploration. In an informed exploration scenario, drone operators need to presently analyze the data collected to quickly figure out where and how to survey next so that the drone operator can make the best use of time while in the field (drone-as-a-service operators need to immediately correct for erroneous data acquisitions, scan an anomaly at a slower speed or closer distance for clarity, to capture a different part of the spectrum with a specialized camera, etc.)

In a proactive maintenance scenario, a maintenance engineer needs to quickly operate the drone and act on insights within the same day or the hour rather than having them revisit the remote location multiple times (e.g. monitoring/maintaining pipelines, power-lines, wind turbines, or solar panels in remote areas). In a disaster mitigation scenario, drone images need to be rapidly analyzed to provide timely insights to agencies that manage ongoing environmental disasters (e.g. forest fires).

Figure 2:
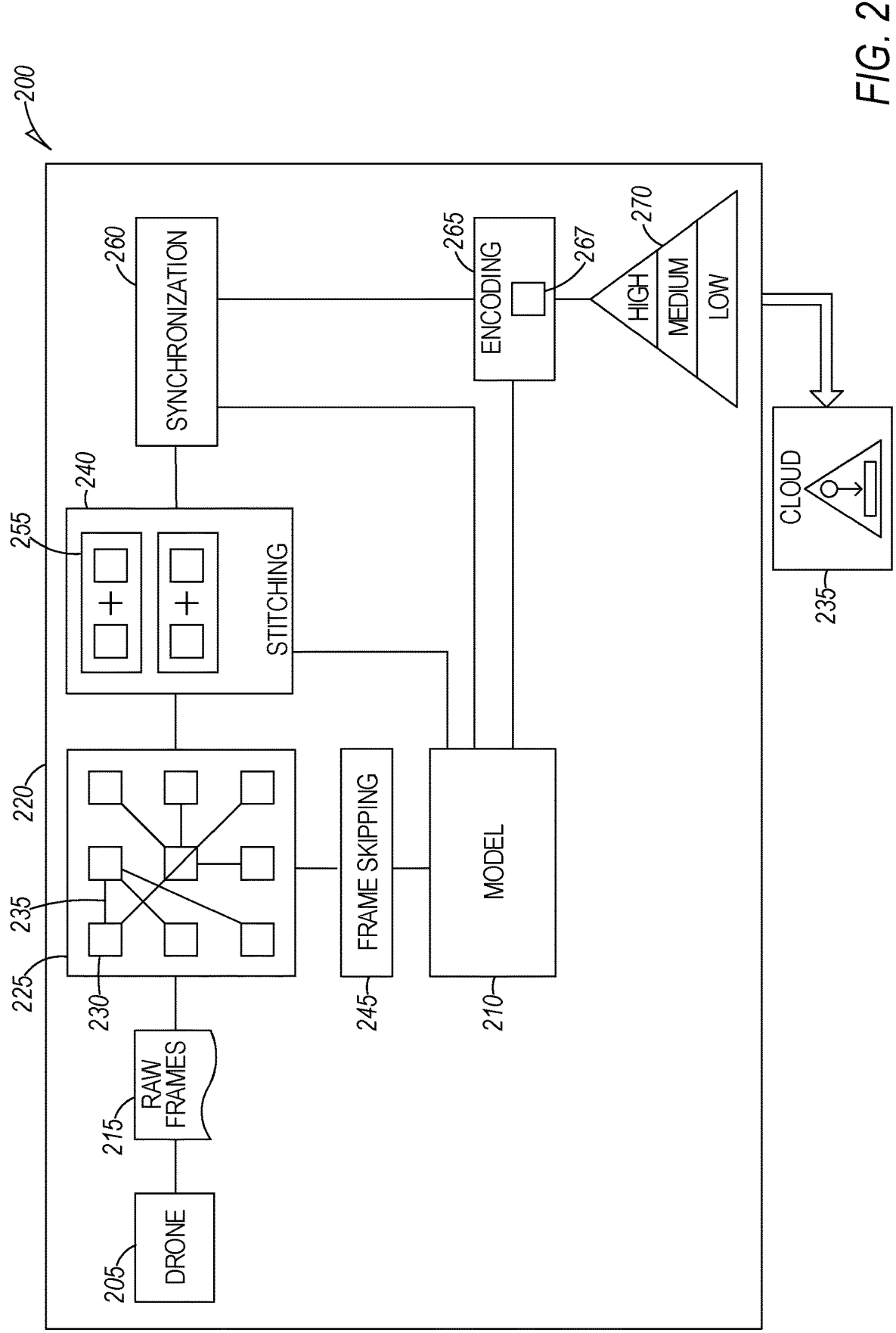
FIG. 2 is a block flow diagram that illustrates a system that includes a drone to perform a survey and accelerate 3D image analytics according to an example embodiment.

FIG. 2 is a block flow diagram that illustrates a system 200 that includes a drone 205 to perform a survey and accelerate 3D image analytics by identifying smaller parts of the data that can actually benefit from 3D analytics and prioritizing building, and uploading the localized 3D images for those parts.

System 200 provides for interactive sessions between a surveyor and an operator. The operator is a person or an autonomous agent present at an edge location where the drone 205 survey is to occur. The surveyor is a person or an autonomous agent which is remotely interacting with the operator via a cloud agent that analyzes information captured by the drone 205. The surveyor provides the operator with a large region of interest to be surveyed and a domain specific inference model 210, such as MobileNet V2, trained to recognize objects/features that the surveyor considers important. Different importance levels can be set for different objects/features.

The operator then feeds the region of interest into any drone specific navigation planning software that helps chart a path that the drone follows for the fastest and most battery/energy optimal way to survey the region. The use of such planning software is optional, as the operator may simply manually control the drone to survey the region.

Raw frames 215 captured by the drone 205 are then streamed to local processing resources such as a laptop or workstation(s) carried to the field by the operator. The local processing resources may be referred to as the edge device 220. The edge device 220 may include a single laptop or a cluster of ruggedized servers that can be mounted in a vehicle with the operator.

The raw frames 215 are first absorbed into a graph data store 225 to create a graph of the raw frames also indicated at 225. The graph includes nodes 230 that represent images. The nodes are connected by graph edges 235. Graph edges, referred to as edges, include weights that represent how much potentially overlapping content the images connected by an edge may have with respect to each other based on geographic and camera angle information provided by the camera with each image.

The graph data store 225 may be searched by a localized stitching agent 240 using a random walk for frames that contain aspects that are important for the application using the domain-spec model 210. Optionally, frame skipping 245 may be performed prior to use of the domain-specific model 210 to reduce the number of image frames to be processed by the model 210. As soon as such important aspects are found, the stitching agent 240 searches the connected frames to start building a localized 3D image 255. Due to frame skipping 245, the number of image frames stitched may be reduced by not using image frames that provide essentially duplicate information. The model 210 may be used again to assist with prioritized processing and synchronization 260 to update the image in the order of priority needed by the application.

A progressive encoding agent 265 works on the unique frames 267 that are generated to encode them into a number of layers and segments with varying priorities, high, medium, and low indicated at a priority engine 270. The encoded segments are transmitted to a cloud component 275 in a descending order of priority.

The cloud component 275 receives the segments and progressively enhances the unique frames by decoding them and feeding them to the surveyor as represented by triangle 280 which represent data upload order. The surveyor may analyze the unique frames as the segments are received and sends insights to the surveyor who interactively decides which parts of the region need attention or more detailed surveying and instructs the operator accordingly. By greatly reducing the amount of transmitted data, the interactivity may occur in near real time or at least with much less delay than would be incurred by prior techniques.

At a high level, raw image frames 210 coming in from drone 105 are converted to a stream of small area localized 3D images that are selected to contain information necessary to gain holistic insights. Instead of constructing the full 3D image in a single go, only portions of the images that can help an application gain necessary insights quickly are incrementally constructed.

A graph processing technique provides the right abstractions for performing these operations online. One insight behind choosing a graph as the underlying structure is that drone frames are related to each other from a content overlap perspective, rather than from a purely temporal or spatial perspective. It is the content of the frames that allows the stitching of frames into a coherent 3D image.

When considering more holistic content-oriented aspects to find related frames, a graph data structure emerges naturally where each frame has content that overlaps with many other frames that are neither spatially nor temporally local. The graph is condensed into a single 3D image before performing analysis while the graph may be processed by prioritizing focus on the parts of the graph that are more important for the interactive application.

Application-focused 3D image processing may be used to speed up the processing of frames. Content overlap (modeled as a graph of frames) is leveraged as the locality metric for converting raw image frames to 3D images. In addition, focusing only on the relevant objects/features of the landscape further helps by prioritizing focus on what is important to the application.

The application/domain knowledge-based model 210 may be trained and used to identify such relevant objects/features. The model uses only the raw image frames containing information about the identified object/features to prioritize building only the associated local 3D image. Training data for the model 210 may include image frames having application specific features labeled using a conventional image classifying model such as a convolutional neural network specifically trained with labeled data relevant to the application of interest.

Where labelled data is easily available, models may be trained in a conventional matter. For areas and domains or applications with little or no images available to label, domain models may be built or trained using synthetic data from virtual reality environments. Raw drone frames may be obtained from environment simulation platforms, such as an Airsim platform to generate synthetic/virtual labelled data for modelling. Given virtual environments in in a simulator, virtual drones may be operated in the virtual environment to collect frames which can be labelled automatically by a virtual reality engine. The labels may be used to train the domain model.

Informed stream processing may be used to locally and incrementally build localized 3D images. 3D images may be efficiently built by carefully selecting from newly added raw image frames only those frames that are related by content to the 3D image being built. The application/domain model is additionally used to identify the correct subset of the incoming frames as they are streamed from the drone.

Progressive transfer may be used to send the 3D images to the cloud by progressively enhancing their quality to further reduce the latency to insights. Furthermore, the important objects/features within the localized 3D images may be enhanced in quality faster than the rest of the image to further improve efficiencies on the network transfers.

Graph 225 may be created as data is either streamed live from the drone 205 or as batches of images are uploaded as the drone 205 comes in contact with the edge device 220. Graph 225 is created as the images are stored by a storage system graph data store 225 in the form of a weighted graph database structure with frames 230 as vertices. Two frames 230 are connected via an edge 235 if they have any potential overlap. The weight of the edge 235 represents the amount of potential overlap. The graph 225 may be stored in one example as a Python-based adjacency list and is used further components to build 3D images and unique-frames.

Drone camera metadata may include geographic data such as location, direction, focus, field of view etc., that is used to help reduce the search space when looking for frames that may potentially overlap with each other without even looking at the pixel data. The use of such geographic data as opposed to using an exhaustive and thus expensive computer vision-based searches of similar features to identify overlaps saves significant processing resources.

Each frame 230 is tagged by the drone 205 with its location (GPS) as well as the direction (roll, pitch, yaw, and focus) in which the camera was pointing at the time of capturing the frame. This information is used to a build a three-dimensional cone, such as cone 127, with a cutoff-distance, beyond which the focus is considered moot, to represent the field of view of the frame. For each newly added frame, its cone's intersection with all other existing cones in a radial distance from the location of the camera is calculated. An edge is added for every cone intersection and the weight of the edge is set in proportion to the relative size of the intersection.

Cone intersection relative size may be calculated using a PostGIS geometric database instance as one example. Each new cone is first added to a graph database and then a query is posed to search for all the intersecting cones found in a radial distance bound which is equal to the cutoff-distance. Such 3D geometric queries, while sounding complex, are a well optimized query type in vector calculus based data bases that are typically answered in under a millisecond even for 1,000 cones which is significantly more cones than are found within a typical cutoff-distance which may be selected as desired.

Stitching agent 240 uses a local stitching approach, where instead of building one global 3D image with all the frames, stitching agent 240 constructs a set of local 3D images of areas of interest to the application. System 200 uses the domain specific inference model 210 to identify sub-regions/segments/objects/features in the images, simply referred to as segments, that are desired for the application and stitches only the corresponding frames to build a localized 3D image.

The technically challenging part is to identify these areas of interest from a large set of frames without running computationally heavy inference models on every frame. The system 200 may use a two-phase approach to identify the areas of interest. First, system 200 discovers a frame from an unexplored area of interest using a random walk approach on an area-tracking data structure stored in the graph database.

Once such a frame is found, a greedy approach is used on the graph data store to find all frames that overlap with the interesting segment found. Those frames are used to build the 3D image by stitching agent 240.

Identifying segments of interest is performed using the model 210, also referred to as domain-specific segmentation and labeling model to identify important segments to prioritize. Such a domain-model 210 can be provided by an application developer. Alternatively, such a model 210 can be selected from a model library built for various scenarios in agriculture, energy, and other commercial industry verticals. The selected model 210 may be adjusted to vary importance of each segment type to an application specific desire. Examples include adjusting the model to reflect that foliage is more important than the trunk of a tree or bush. Additionally, system 200 may also accept direct input from the operator or the surveyor as to which areas to prioritize over others. For example, specific aisles of trees or specific trees in an orchard may be prioritized.

Historic information or other imagery, such as satellite imagery that is significantly lower in resolution and can also be out of date, can be used to supplement the domain-model.

Discovering unexplored segments of interest may also be performed to quickly and efficiently discover new segments that have not been stitched or are being stitched into a localized 3D image. System 200 tracks the explored areas, i.e., areas for which the 3D model has been constructed, in an "area-tracking" data structure. For such tracking, another instance of PostGIS may be used, or any other data structure that lists the images and contains a flag or other indicator of already used images or areas covered such that images of the covered areas are removed from consideration.

In order to avoid searching all frames for new segments of interest, system 200 uses a random walk to search for newly obtained frames for important segments while relying on the area-tracking data store to record old frames that have already been explored with the domain-model 210. System 200 picks frames with a less amount or threshold of intersection with the areas that are marked as already explored in the area-tracking database as new frames can overlap with old frames. The intersection threshold may be configurable. This search completes when the surveyed region has been fully covered in the area-tracking database.

Another optimization for detecting important segments may include running the domain model 210 on a lower resolution version of the image frames. However, this can come at the cost of reduced accuracy. For typical drone frames which are high in resolution, segmentation is often just as accurate when the frames are reduced in resolution by up to 36%.

The stitching of a localized 3D image can be started as soon as a sufficient number of frames have been found to cover a segment of interest in consideration. Once a frame with a segment of interest is discovered, the graph data store may be used to find the most relevant other frames and to construct the 3D image. Each stitching job independently decides which frames to consider for the stitching. For the selection, those frames are considered that are most likely to contain the pixels corresponding to the important segment that triggered the current localized 3D image in the first place.

To identify such frames, using the graph data store, the frames with the most overlap (frames with the highest edge weights) in proximity to the geographic location of detected important segments are traversed. The stitching agent 240 exhaustively runs the domain-model 210 on each such frame (not a random walk) to decide whether to include that frame or not, as it knows that the important segment is highly likely to be found here. However, the stitching itself starts only when enough number of such frames from multiple directions have been identified in order to create a high-quality 3D image of the important segment.

In one example enough frames have been identified in response to a timeout of an alarm that is reset each time a new frame is added live by the drone that overlaps with any of the frames that are considered already a part of the stitching job. This is enforced at the frame ingestion time.

In various examples, the created 3D image may be directly sent to the cloud for processing. In further examples, various further mechanisms may be used to transfer relevant data even more efficiently.

Progressive encoding agent 265 may be used to project localized 3D images onto 2D surfaces such as a plane (an aisle of trees) or a cylinder (around a tree) so that analysis with traditional computer vision pipelines becomes easier. Even with deduplication through 3D image reconstruction, the resulting unique-frame (or projections) sizes are huge, i.e., they can contain 10-100s of millions of pixels with sizes of 10-100s of MBs. The size can be reduced by recognizing that not all of the data in the frame is useful for the application. Most of the frame is often irrelevant and contains unimportant information. For example, if an application is designed to study fruit trees, portions of the captured image representing the sky, lawn, and background of a fruit tree orchard are unimportant for studying fruit trees. Portions of the image containing the fruit trees are important to the application. Important portions can thus be highly dependent on application.

Drones are configured to capture pessimistically high-resolution images (4K is common with 32 bit pixel depth) as a way to ensure that the acquired data can serve future needs of applications that may demand higher resolution. However, 1080P or lower resolutions are often enough for analysis in today's applications. Moreover, among the segment types output by the domain-model, not all are equally important.

For example, the fruit on a tree could be more important than the tree itself for an application designed to analyze information about fruit on trees in the orchard. The encoding goal is to tie the resolution and quality of each segment of unique-frames to applications requirements, referred to as "semantic-aware encoding". By doing so, further compression is achievable beyond any given image encoder. For example, a high-quality JPEG (or any given codec) encoding may be used for the segments containing fruit while a lower quality JPEG encoding can be used for other segments. This enables a segment-differentiated encoding that leads to orthogonal savings. The encoding may thus be performed progressively based on segments.

Once a unique-frame is generated from the localized 3D image, it is decomposed by the domain-model 210 into multiple small segments with different semantics (e.g., tree, grass, sky). Then each segment is compressed with base-delta encoders to produce a base file containing the minimal and most important data, followed by multiple delta files each enhancing the base component.

By breaking down unique-frames into such fine-granularity data, system 200 aggressively shrinks the transmission volume and the network latency to start analytics. It first only sends the minimal, yet the most important files (typically only 0.01% of the unique-frame size) which identify the segment types, boundaries and locations (segmentation masks). System 200 may progressively send the rest of the data to gradually enhance the fidelity of data in a way that prioritizes the requirements of the application. Thus, by using a combination of progressive image encoding and prioritized transfer of segments, system 200 is able to improve the perceived latency for remote applications.

Data transfer to the cloud may be performed via the priority queue schema indicated at priority engine 270. Engine 270 retains a priority index structure that maintains an ordered queue of items to be transferred. A PostgreSQL DB instance may be used for example, to track the priority of each file. Each item in this priority index is a pointer to a file to be transferred, either segmentation mask, base file, delta file, unique frame, or frame. The mapping of files to priority indexes is a configurable component in the data transfer engine 270.

In one example, for each newly encoded segment, the engine 270 uses the associated segment type to dynamically decide the priority of the base file and uses this priority to relatively decide the priority of the delta files. For example, if the mask determines the priority of the "tree" segment to be '5', the delta files are given priority '4.5'. Raw data is given a low priority.

The data transfer engine 270 uses a remote/cloud mounted folder 280 shared with the application in the cloud 275. The engine 270 may for example be implemented in C++, runs as a container that monitors the folders being created by stitching containers, understands their importance level (using the priority index DB), and copies the data to the remote mounted folder in that order. The transfer engine 270 also allows preemption, i.e., it can stop mid-file when needed and switch over to more important ones. In addition, it handles failures and reboots by tracking its own progress in the priority index DB. While priority-based data synchronization solutions exist in other settings (Section 6), this is a new synchronization mechanism for edge-cloud systems that supports priorities and hierarchies when sending files to a cloud storage service.

Unique frames often contain a significant number/amount of segments not useful to remote applications and surveyors, such as background elements. Further optimization of the latency of insights to the surveyor may be obtained by masking such background elements to greatly reduce the data to be transmitted. In other words, data representative of the background elements is masked out. The masks of segments of unique-frames arrive first in the cloud, followed by the actual data of the unique-frames (base and delta files). These masks are typically 10,000 times smaller in size compared to the size of unique frames generated at the edge. By just using these masks, some statistics can be obtained in the cloud right away. The presence of certain segment types indicated by the importance level in masks can help applications perform certain tasks such as counting, sizing, and anomaly detection.

In parallel, system 200 may use the mask to "synthesize" pixels in blank unimportant segments, therefore, offering instant visualization and reducing latency to certain application tasks that accept "synthesized" data (statistical ones). In one example, the sky in an image may be synthesized as a blue area with the ground generated as a green area. A generative adversarial network may be used for the synthesis, where it trains these GANs per domain such as crop inspections, forest fire risk detection, power-lines maintenance, etc.

Using the mask and a trained GAN, system 200 can quickly generate a synthetic frame. After a short time, the base file of the most important segment ("tree" in one example) shows up. Then, the system 200 offers a hybrid view of the images with real pixels for important segments and faked data for less important segments. This is especially useful for scenarios where the surveyor is a human who interactively works with the operator for informed exploration. It is also useful for DNNs that are overfit to high-quality training data and hence require the low-important segments to be present for inference to succeed.

As time passes, the refinement delta bits arrive and the rest of the data (for less important segments) follows later when there is more bandwidth available. In all cases, applications register for notifications from the filesystem, which automatically triggers functions and pipelines for each refinement stage (as a way of tying image quality with the task at hand).

Figure 3:
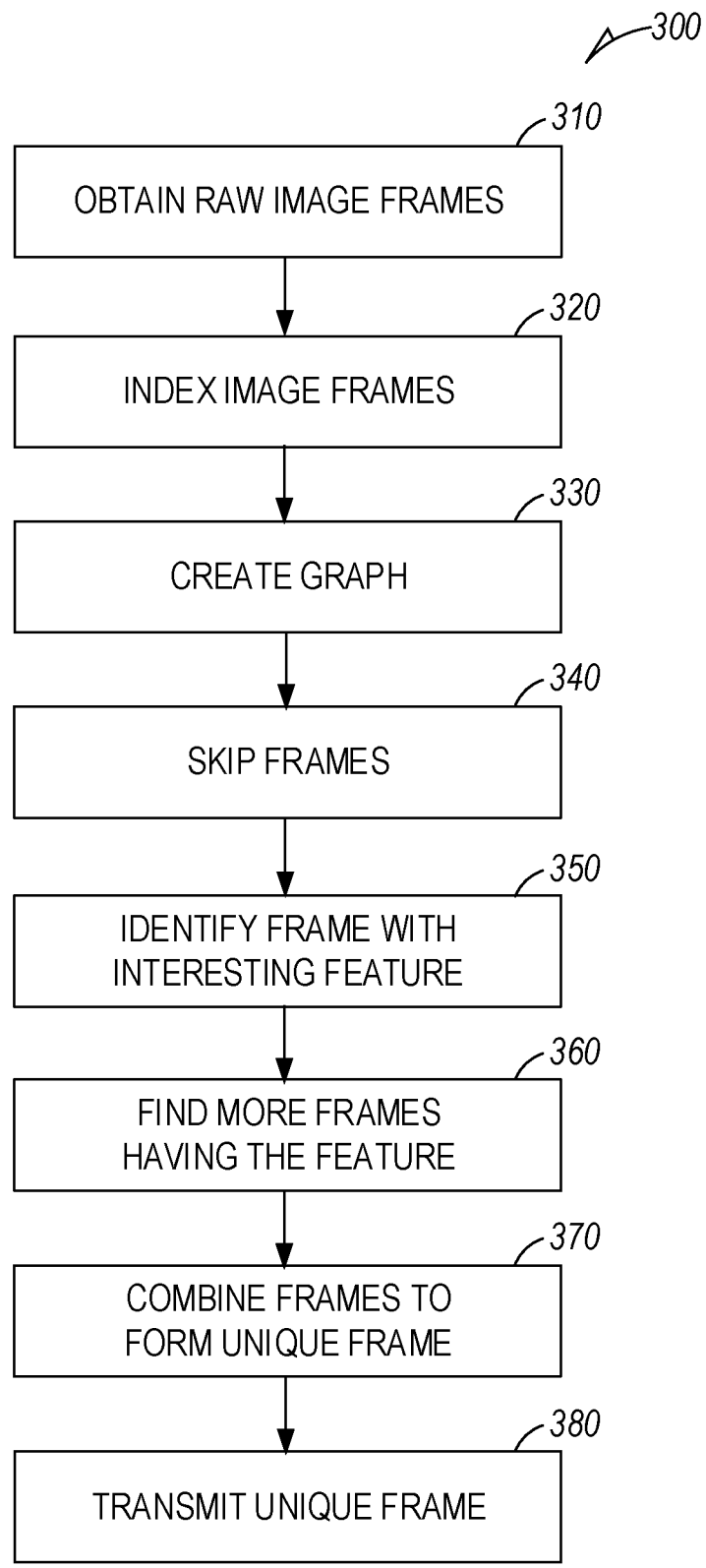
FIG. 3 is a flowchart of a computer implemented method 300 for conducting a survey of an area for a particular application in order to collect useful data

FIG. 3 is a flowchart of a computer implemented method 300 for conducting a survey of an area for a particular application in order to collect useful data. Method 300 performs operation executed by one or more computer processors. Method 300 begins at operation 310 by obtaining data for raw image frames captured by a moving camera. At operation 320, the raw image frames are indexed geographically. Such indexing may be performed using PostGIS and Python Shapely utilities in one example. Any indexing mechanism that allows indexing of polygons in three dimensions may be used. A graph is created at operation 330 from the multiple raw image frames. The graph includes image frames as vertices and edges representing the image frames having overlapping image information. An edge includes an indication of content overlap between image frames the edge connects in the graph.

At operation 340, frames may be skipped based on the amount of geographical overlap of the images. Such skipping may be based on a selected overlap percentage threshold to possibly greatly reduce the number of images to be further processed. In one example, frame skipping is a batch operation. Each frame in a batch of frames is evaluated for overlap with fields of view that have already been covered. The frames in the batch with the least amount of overlap are added as remaining frames. Frames with the most amount of overlap are skipped. Such skipped frames may later be considered in a lower priority background task. An example overlap threshold is between 90% to 95%. If the threshold percentage of frame's field of view has already been covered, the frame is skipped.

Operation 350 determines from the remaining frames, a frame having an interesting feature. Operation 350 may include using a domain specific inferencing model trained to classify application domain sub-regions of the images that are of interest to an application for which the survey is being conducted.

Using the graph, operation 360 finds raw image frames near the frame having the interesting feature. Operation 370 combines the found multiple raw image frames to form a unique image frame. Operation 380 transmits the unique image frame.

Multiple unique image frames may be found using method 300 and transmitted to a surveyor. The surveyor may provide interactive feedback to an operator of a drone that includes the camera to move to obtain more images to obtain better information.

Operation 350 may be performed using a domain specific inferencing model such as a convolution neural network trained to identify objects of interest. The objects of interest are specific to each different application. The graph is then used to locate nearby raw images based on the location of the objects of interest.

Combining multiple raw image frames in operation 370 to form unique image frames is performed using image stitching operations. In some embodiments, the graph also represents image frames having unprocessed overlapping image information to ensure image frames are not processed multiple times.

In one example, method 300 includes deduplicating image frames based on the graph to reduce the graph to unique image fame vertices. This is also referred to as image skipping. An inference engine is used to sort the unique image frames in order of relative importance for an application.

Figure 4:
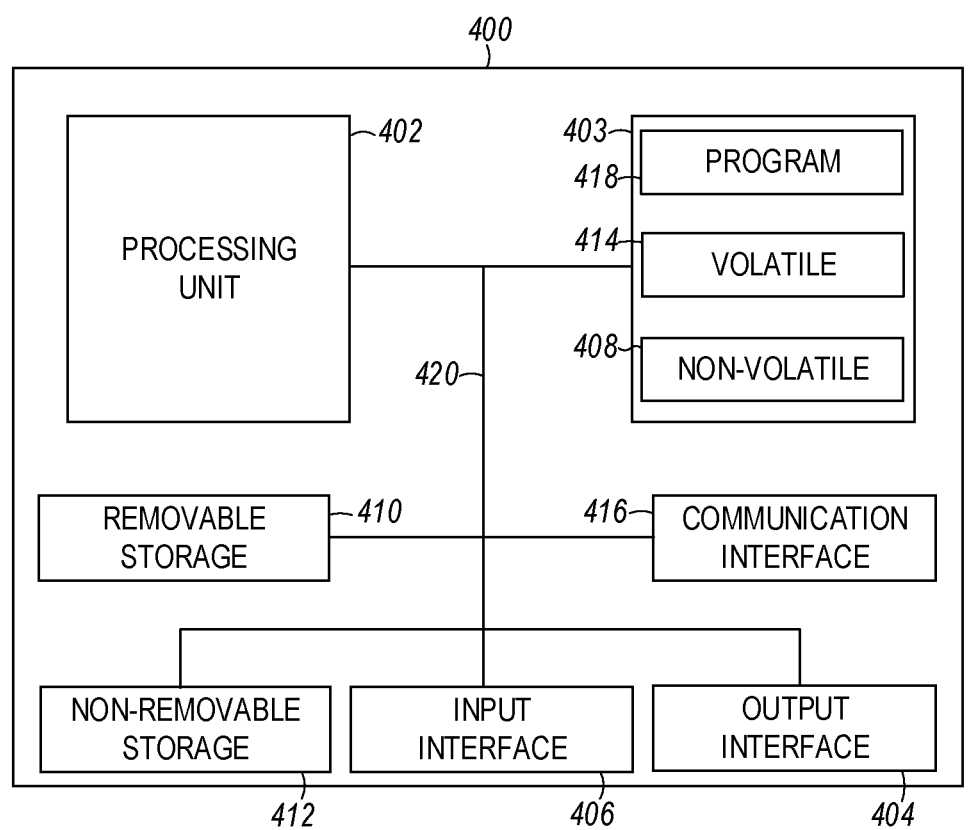
FIG. 4 is a block schematic diagram of a computer system to implement one or more example embodiments.

FIG. 4 is a block schematic diagram of a computer system 400 to process image frame captured by a moving camera and for performing methods and algorithms according to example embodiments. All components need not be used in various embodiments.

One example computing device in the form of a computer 400 may include a processing unit 402, memory 403, removable storage 410, and non-removable storage 412. Although the example computing device is illustrated and described as computer 400, the computing device may be in different forms in different embodiments. For example, the computing device may instead be a smartphone, a tablet, smartwatch, smart storage device (SSD), or other computing device including the same or similar elements as illustrated and described with regard to FIG. 4. Devices, such as smartphones, tablets, and smartwatches, are generally collectively referred to as mobile devices or user equipment.

Although the various data storage elements are illustrated as part of the computer 400, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 403 may include volatile memory 414 and non-volatile memory 408. Computer 400 may include—or have access to a computing environment that includes—a variety of computer-readable media, such as volatile memory 414 and non-volatile memory 408, removable storage 410 and non-removable storage 412. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 400 may include or have access to a computing environment that includes input interface 406, output interface 404, and a communication interface 416. Output interface 404 may include a display device, such as a touchscreen, that also may serve as an input device. The input interface 406 may include one or more of a touchscreen, touchpad, mouse, keyboard, camera, one or more device-specific buttons, one or more sensors integrated within or coupled via wired or wireless data connections to the computer 400, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 400 are connected with a system bus 420.

Computer-readable instructions stored on a computer-readable medium are executable by the processing unit 402 of the computer 400, such as a program 418. The program 418 in some embodiments comprises software to implement one or more methods described herein. A hard drive, CD-ROM, and RAM are some examples of articles including a non-transitory computer-readable medium such as a storage device. The terms computer-readable medium, machine-readable medium, and machine-readable storage device do not include carrier waves or signals to the extent carrier waves and signals are deemed too transitory. Storage can also include networked storage, such as a storage area network (SAN). Computer program 418 along with the workspace manager 422 may be used to cause processing unit 402 to perform one or more methods or algorithms described herein.

EXAMPLES

1. A computer implemented method includes obtaining data for raw image frames captured by a moving camera, indexing the raw image frames geographically, creating a graph from the multiple raw image frames, the graph comprising image frames as vertices and edges representing the image frames having overlapping image information, skipping frames based on the amount of overlap, determining a frame having an interesting feature, using the graph to find additional raw image frames that have the interesting feature, combining multiple raw image frames to form a unique image frame, and transmitting the unique image frame.

2. The method of example 1 wherein a domain specific inferencing model is used to determine a frame having the interesting feature.

3. The method of any of examples 1-2 wherein combining multiple raw image frames to form the unique image frame includes stitching the multiple raw image frames together.

4. The method of any of examples 1-3 wherein the edges represent whether or not the raw image frame has already been used to form a unique image frame.

5. The method of example 4 wherein determining a frame having the interesting feature comprises discovering a frame from an unexplored area of interest by performing a random walk on an area tracking data structure based on the edge representation of whether or not the raw image frame has already been used.

6. The method of any of examples 4-5 and further comprising determining additional unprocessed frames having interesting features and using such additional frames to generate further unique image frames.

7. The method of example 6 and further comprising using a domain specific inferencing model to sort the unique image frames in order of relative importance for an application.

8. The method of any of examples 1-7 wherein an edge comprises an indication of content overlap between image frames the edge connects in the graph based on the geographical information.

9. The method of any of examples 1-8 wherein the moving camera is supported by a drone controlled to survey an area of interest to an application, wherein the raw image frames are obtained from the drone by an edge device, and wherein the edge device performs the operations.

10. The method of example 9 and further comprising receiving drone control actions at the edge device in response to the transmitted unique frame.

11. The method of any of examples 1-10 wherein determining a frame having an interesting feature comprises discovering a frame from an unexplored area of interest by performing a random walk on an area tracking data structure.

12. The method of any of examples 1-11 wherein skipping frames includes processing skipped frames as a background task to perform determining a skipped frame having an interesting feature, using the graph to find additional raw image frames that have the interesting feature, combining multiple raw image frames to form a unique image frame, and transmitting the unique image frame.

13. A machine-readable storage device has instructions for execution by a processor of a machine to cause the processor to perform operations to perform a method. The operations include obtaining data for raw image frames captured by a moving camera, indexing the raw image frames geographically, creating a graph from the multiple raw image frames, the graph comprising image frames as vertices and edges representing the image frames having overlapping image information, skipping frames based on the amount of overlap, determining a frame having an interesting feature, using the graph to find additional raw image frames that have the interesting feature, combining multiple raw image frames to form a unique image frame, and transmitting the unique image frame.

14. The device of example 13 wherein a domain specific inferencing model is used to determine a frame having the interesting feature.

15. The device of any of examples 13-14 wherein combining multiple raw image frames to form the unique image frame includes stitching the multiple raw image frames together.

16. The device of any of examples 13-15 wherein the edges represent whether or not the raw image frame has already been used to form a unique image frame.

17. The device of any of examples 13-16 wherein determining a frame having the interesting feature comprises discovering a frame from an unexplored area of interest by performing a random walk on an area tracking data structure based on the edge representation of whether or not the raw image frame has already been used.

18. The device of any of examples 13-17 and wherein the operations further include determining additional unprocessed frames having interesting features, using such additional frames to generate further unique image frames, and using a domain specific inferencing model to sort the unique image frames in order of relative importance for an application.

19. A device includes a processor and a memory device coupled to the processor and having a program stored thereon for execution by the processor to perform operations. The operations include obtaining data for raw image frames captured by a moving camera, indexing the raw image frames geographically, creating a graph from the multiple raw image frames, the graph comprising image frames as vertices and edges representing the image frames having overlapping image information, skipping frames based on the amount of overlap, determining a frame having an interesting feature, using the graph to find additional raw image frames that have the interesting feature, combining multiple raw image frames to form a unique image frame, and transmitting the unique image frame.

20. The device of example 19 wherein a domain specific inferencing model is used to determine a frame having the interesting feature, wherein combining multiple raw image frames to form the unique image frame includes stitching the multiple raw image frames together, and wherein the edges represent whether or not the raw image frame has already been used to form a unique image frame.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method comprising:
obtaining at an edge device, data for raw image frames captured by a moving camera supported by a drone controlled to survey an area of interest, the data including geographic information for each raw image frame, the edge device performing:
indexing the raw image frames geographically based on the geographic information;
creating a graph from the multiple raw image frames, the graph comprising indexed image frames as vertices and edges connecting the vertices representing the image frames having overlapping image information, each edge including a weight representative of an amount of image overlap between connected vertices, wherein the weight is determined based on the geographic information;
skipping frames based on an amount of overlap threshold;
determining a remaining frame having an interesting feature;
using the graph to find additional raw image frames that have the interesting feature;
combining multiple of the additional raw image frames with the remaining frame to form a unique image frame; and
transmitting the unique image frame.

2. The method of claim 1 wherein a domain specific inferencing model is used to determine a frame having the interesting feature.

3. The method of claim 1 wherein combining multiple raw image frames to form the unique image frame includes stitching the multiple raw image frames together.

4. The method of claim 1 wherein the edges represent whether or not the raw image frame has already been used to form a unique image frame.

5. The method of claim 4 wherein determining a frame having the interesting feature comprises discovering a frame from an unexplored area of interest by performing a random walk on an area tracking data structure based on the edge representation of whether or not the raw image frame has already been used.

6. The method of claim 4 and further comprising determining additional unprocessed frames having interesting features and using such additional frames to generate further unique image frames.

7. The method of claim 6 and further comprising using a domain specific inferencing model to sort the unique image frames in order of relative importance for an application.

8. The method of claim 1 and further comprising receiving drone control actions at the edge device in response to the transmitted unique image frame.

9. The method of claim 1 wherein determining a frame having an interesting feature comprises discovering a frame from an unexplored area of interest by performing a random walk on an area tracking data structure.

10. The method of claim 1 wherein skipping frames comprises processing skipped frames as a background task to perform:
determining a skipped frame having an interesting feature;
using the graph to find additional raw image frames that have the interesting feature;
combining multiple raw image frames to form a unique image frame; and
transmitting the unique image frame.

11. A machine-readable storage device having instructions for execution by a processor of a machine to cause the processor to perform operations to perform a method, the operations comprising:
obtaining at an edge device, data for raw image frames captured by a moving camera supported by a drone controlled to survey an area of interest, the data including geographic information for each raw image frame, the edge device performing:
indexing the raw image frames geographically based on the geographic information;
creating a graph from the multiple raw image frames, the graph comprising indexed image frames as vertices and edges connecting the vertices representing the image frames having overlapping image information, each edge including a weight representative of an amount of image overlap between connected vertices, wherein the weight is determined based on the geographic information;
skipping frames based on an amount of overlap threshold;
determining a remaining frame having an interesting feature;
using the graph to find additional raw image frames that have the interesting feature;
combining multiple of the additional raw image frames with the remaining frame to form a unique image frame; and
transmitting the unique image frame.

12. The device of claim 11 wherein a domain specific inferencing model is used to determine a frame having the interesting feature.

13. The device of claim 11 wherein combining multiple raw image frames to form the unique image frame includes stitching the multiple raw image frames together.

14. The device of claim 11 wherein the edges represent whether or not the raw image frame has already been used to form a unique image frame.

15. The device of claim 11 wherein determining a frame having the interesting feature comprises discovering a frame from an unexplored area of interest by performing a random walk on an area tracking data structure based on the edge representation of whether or not the raw image frame has already been used.

16. The device of claim 11 and wherein the operations further comprise determining additional unprocessed frames having interesting features;
using such additional frames to generate further unique image frames; and
using a domain specific inferencing model to sort the unique image frames in order of relative importance for an application.

17. A device comprising:
a processor; and
a memory device coupled to the processor and having a program stored thereon for execution by the processor to perform operations comprising:

obtaining at an edge device, data for raw image frames captured by a moving camera supported by a drone controlled to survey an area of interest, the data including geographic information for each raw image frame, the edge device performing:

indexing the raw image frames geographically based on the geographic information;

creating a graph from the multiple raw image frames, the graph comprising indexed image frames as vertices and edges connecting the vertices representing the image frames having overlapping image information, each edge including a weight representative of an amount of image overlap between connected vertices, wherein the weight is determined based on the geographic information;

skipping frames based on an amount of overlap threshold;

determining a remaining frame having an interesting feature;

using the graph to find additional raw image frames that have the interesting feature;

combining multiple of the additional raw image frames with the remaining frame to form a unique image frame; and transmitting the unique image frame.

18. The device of claim 17 wherein a domain specific inferencing model is used to determine a frame having the interesting feature, wherein combining multiple raw image frames to form the unique image frame includes stitching the multiple raw image frames together, and wherein the edges represent whether or not the raw image frame has already been used to form a unique image frame.

* * * * *